United States Patent [19]
Prost et al.

[11] 3,882,129
[45] May 6, 1975

[54] 4-CARBAMOYL-1-(P-FLUOROBENZOYL-PROPYL)DECAHYDROQUINALINE DERIVATIVES

[75] Inventors: Maurice Prost, Brussels; Marcel Urbain, Waterloo, both of Belgium

[73] Assignee: Labaz, Paris, France

[22] Filed: Nov. 24, 1972

[21] Appl. No.: 309,446

[30] Foreign Application Priority Data
Nov. 23, 1971 United Kingdom........... 54466/71

[52] U.S. Cl....... 260/287 R; 260/283 S; 260/289 R; 424/258
[51] Int. Cl............................................ C07d 33/48
[58] Field of Search............. 260/287 R, 289, 293.8

[56] References Cited
UNITED STATES PATENTS

| | | | |
|---|---|---|---|
| 3,041,344 | 6/1962 | Janssen............................. | 260/293.8 |
| 3,056,792 | 10/1962 | Geschickter.................... | 260/289 R |
| 3,171,838 | 3/1965 | Janssen............................. | 260/293.8 |
| 3,227,720 | 1/1966 | Brossi et al. .................... | 260/289 R |

OTHER PUBLICATIONS
J. F. O'Seary et al., Proc. Soc. Exptl. Biol. Med., 76, 738–741 (1951).

*Primary Examiner*—Donald G. Daus
*Assistant Examiner*—David E. Wheeler
*Attorney, Agent, or Firm*—Mason, Kolehmainen, Rathburn & Wyss

[57] ABSTRACT
Decahydroquinolinol derivatives of the general formula

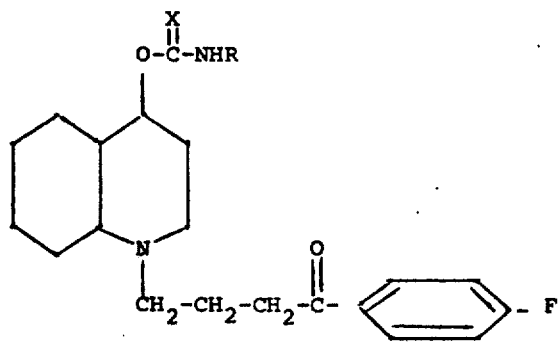

and the pharmaceutically acceptable acid addition salts thereof, wherein R represents hydrogen, methyl, ethyl, n-propyl, isopropyl, allyl, a cycloaliphatic radical, for example cyclopentyl or cyclohexyl, a phenyl radical optionally substituted by a fluorine, chlorine, or bromine atom or methoxy group, or an aralkyl radical, for example a benzyl radical, and X represents an oxygen or sulphur atom, are useful anti-adrenergic agents which exert a powerful action against the toxicity of biogenetic amines such as epinephrine and norepinephrine, as anti-arrhythmia agents useful in the treatment of cardiac arrhythmia such as ventricular tachycardia, as sedatives, and as agents for the relief of certain forms of hypertension and diseases of the peripheral vascular system.

10 Claims, 1 Drawing Figure

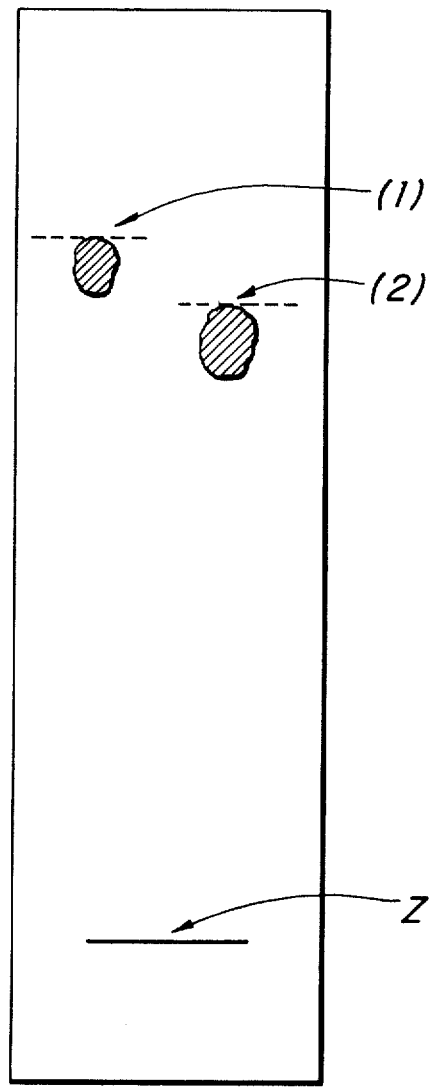

4-CARBAMOYL-1-(P-FLUOROBENZOYS-PROPYL)DECAHYDROQUINALINE DERIVATIVES

This invention relates to heterocyclic compounds and is concerned with novel decahydroquinolinol derivatives and pharmaceutical compositions containing the same, and a process for preparing the said decahydroquinolinol derivatives.

The decahydroquinolinol derivatives with which the invention is concerned are the compounds represented by the general formula:

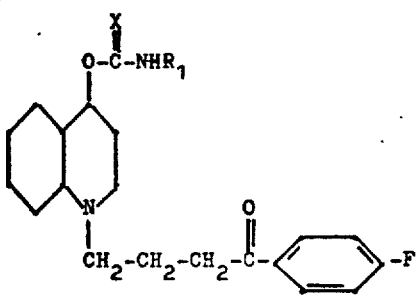

and the pharmaceutically acceptable acid addition salts thereof, wherein $R_1$ represents hydrogen, methyl, ethyl, n-propyl, isopropyl, allyl, a cycloaliphatic radical, for example cyclopentyl or cyclohexyl, a phenyl radical optionally substituted by a fluorine, chlorine or bromine atom or methoxy group, or an aralkyl radical, for example a benzyl radical, and X represents an oxygen or sulphur atom.

The compounds of formula I may be prepared by reacting 1-[4-(4-fluoro-phenyl)-4-oxo-butyl]-4-hydroxy-trans-decahydroquinoline having the following formula:

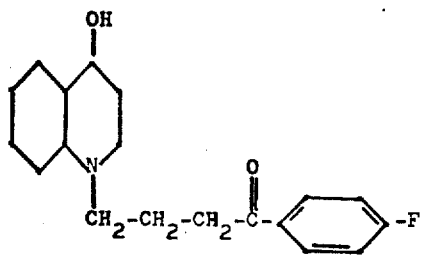

preferably in an inert organic solvent such as, for example, benzene, toluene or xylene and at room temperature, with a compound of the general formula:

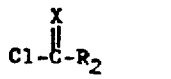

III wherein X represents an oxygen or sulphur atom and $R_2$ represents chlorine or a phenoxy radical, to obtain a thio- or carbonyloxy derivative of the general formula:

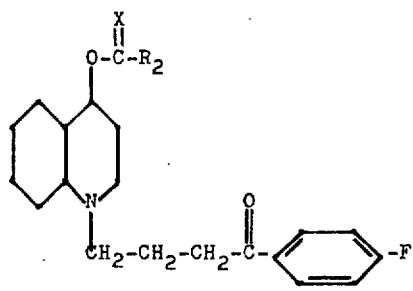

IV wherein X and $R_2$ have the meanings defined above, which may be condensed with ammonia or a primary amine of the general formula:

V wherein $R_1$ has the same meanings as in formula I, preferably in an inert organic solvent, for example benzene, toluene or xylene and at room temperature, to form the corresponding decahydroquinolinol carbamic ester of formula I in the form of its free base, which if desired may be reacted with an organic or inorganic acid which will form the cororesponding pharmaceutically acceptable acid addition salt thereof.

The starting compound of formula II, namely 1-[4-(4-fluoro-phenyl)-4-oxo-butyl]-4-hydroxy-trans-decahydroquinoline, may be prepared by reacting 4-hydroxy-trans-decahydroquinoline with a halogenated compound of the general formula:

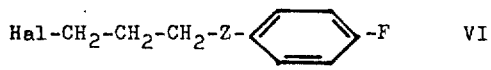

VI wherein Hal represents chlorine, bromine or iodine and Z represents the

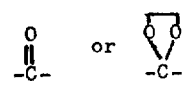

radical.

This reaction is preferably carried out either in an inert organic solvent, for example benzene, toluene, xylene, dichloromethane or tetrahydrofuran, or in an alcoholic medium, for example butanol or aqueous ethanol, or in a ketonic medium, for example acetone or methyl ethyl ketone, and in the presence of an acid acceptor, preferably an alkaline carbonate, for example potassium carbonate or sodium bicarbonate.

The reaction, which may be accelerated by the use of small quantities of potassium iodide is preferably carried out at the reflux temperature of the solvent.

When Z represents a ketal group, this function may, if desired, be further hydrolysed to an oxo radical by heating in an acid aqueous medium.

The halogenated compounds represented by formula VI may be prepared in accordance with the method described in Ind. Chim. Belge 1960, 25, 1073 and the ketalisation may be effected by known procedures.

4-Hydroxy-trans-decahydroquinoline is a known compound and can be prepared by reduction of 4-oxo-trans-decahydroquinoline in accordance with the method described in Bull. Acad. Sci. USSR,1962, 1599. This method produces a mixture of axial and equatorial isomers. Hence the reaction of 4-Hydroxy-trans-decahydroquinoline with the halogenated compound of formula VI will give the starting compound of formula II, namely 1-[4-(4-fluoro-phenyl)-4-oxo-butyl)]-4-hydroxy-trans-decahydroquinoline, in the form of a mixture of the axial and equatorial isomers. This mixture may be separated into two fractions by virtue of the differing solubilities of the isomers in an aromatic hydrocarbon such as benzene. However, it has not yet been possible for us to determine whether the fraction which is insoluble in aromatic hydrocarbons is constituted by either the axial or equatorial isomer or possibly by a mixture of the two, and likewise with the soluble fraction. In view of this, the term "form(1)" will hereinafter be used to designate that carbinol represented by formula II of which the Rf in the chosen assay of thin layer chromatography is superior to that of the corresponding isomeric carbinol which will be designated hereinafter by the term "form(2)". The results of the thin layer chromatographic assay in question are illustrated in the accompanying drawing.

The significance of the figures (1) and (2) and of the letter Z appearing in the accompanying drawing is given in the following explanation:

Z=starting line for migration of the mixture of solvent and carbinols "form(1)" and "form(2)" corresponding to Formula II.

(1)=limit reached by the spot corresponding to 1-[4-(4fluoro-phenyl)-4-oxo-butyl]-4-hydroxy-trans-decahydroquinoline [form (1)] when the solvent front has gone over 10 cm.

(2)=limit reached by the spot corresponding to 1-[4-(4-fluoro-phenyl)-4-oxo-butyl]-4-hydroxy-trans-decahydroquinoline [form(2)] when the solvent front has gone over 10 cm.

The Rf, in this case, corresponds to the figure obtained when the distances Z(1) or Z(2) expressed in cm are divided by the distance travelled by the solvent i.e. 10 cm.

In the test described the Rf for the "form(1)" carbinol of Formula II was found to be 0.80 and for the "form(2)" carbinol 0.71. Details of the assay used in this case are as follows:

Support: Silicagel Merck HF 254
thickness: 0.25 mm
(activation for 30 minutes at 110°C.)
Development and saturation solvent(in ammonia atmosphere)
Hexane: 50.0 ml
Chloroform: 47.5 ml
Methanol: 2.5 ml
Technique: ascending 10 cm (3 migrations)
Deposits: 200 ug (chloroform solution)
Revealing: U.V. at 2,540 A in iodinevapor The isomer of "form (1)" is also the carbinol represented by formula II which is the more soluble in an aromatic hydrocarbon and with a melting point of 111–113°C while the isomer of "form (2)" is the carbinol represented by formula II which is the less soluble in an aromatic hydrocarbon and with a melting point of 110°C.

The same demoninations "form (1)" and "form (2)" will be used hereinafter to designate the corresponding isomers of the substances of formulae IV and I of which the starting product is either "form (1)" of "form (2)" of the carbinol represented by formula II.

Consequently, the above described processes for obtaining the derivatives of formula I using derivatives of formula II as starting products are equally applicable to either "form (1)" or "form (2)" of the derivatives of formula II for the preparation of the corresponding isomers of formula I.

The compounds of the present invention have been found to possess valuable pharmacological properties and in particular an unexpected anti-adrenergic effect with regard to certain catecholamines such as epinephrine and norepinephrine.

Compounds falling within the definition of formula I have been found to exert a powerful action against the toxicity of these biogenetic amines. They oppose various systemic effects of the catecholamines in question and more particularly effects occurring in the cardiovascular system such as epinephrine- and norepinephrine-provoked arterial hypertension and tachycardia caused by epinephrine. These compounds have also been found to reduce the amount of epinephrine experimentally increased in the animal heart as well as certain biological disorders resulting from stress.

The compounds of formula I also possess anti-arrhythmia properties which become apparent at doses of 1 to 10 mg/kg in respect of various types of cardiac arrhythmia experimentally induced in the animal such as, for example, ventricular tachycardia produced by substances capable of disturbing the cardiac rhythm such as strophantin, barium chloride and acetylcholine.

The compounds of the present invention have also been found to possess a sedative action on motricity. As indicated by DE SCHEPPER in his discussion of the anti-adrenergic compounds, taken from his "Introduction pharmacologique generale [see "Compendium des Specialites pharmaceutiques belges"-First edition, page 38 (1972)]" this (sedative action) may be a hindrance—although a certain habituation usually sets in—or on the other hand it may be useful whenever sedation is required. It has been observed that the motor-sedative activity of the compounds of the invention is exerted to different degrees. For example, it has been noted that, at the therapeutic doses used to produce an anti-adrenergic or anti-arrhythmic effect, some compounds of the invention possess an appreciable sedative action on motricity while others are practically devoid of such an effect.

The anti-adrenergic and anti-arrhythmic compounds of the invention may thus be employed according to whether a sedative action is required or not.

Finally, the compounds of the present invention have also been found to exert a favourable effect upon fibrinolytic and thrombolytic processes.

In the light of these various properties it may be considered that the compounds of the invention are likely to constitute valuable agents in the treatment of disorders of the cardiovascular system of adrenergic orgin such as, for example, certain forms of hypertension, tachycardia and arrhythmia, diseases of the peripheral vascular system such as arteritis as well as atheromatous and thrombotic states in which epinephrine and norepineprhine may play a part. Moreover, the anti-arrhythmic properties of the compounds of the invention are not limited to arrhythmias of adrenergic origin which fact is likely to render them useful in the treatment of all types of arrhythmia. Finally, the selective action of the compounds of the invention with respect to the effects of epinephrine and norepinephrine render them potentially useful in the control of those cerebral functions in which it is known that these two catecholamines play a part.

There are at present in existence numerous substances which are capable of producing an anti-adrenergic effect as well as of restoring the cardiac rhythm in cases of arrhythmia. Although, the majority of these substances give satisfactory results, they are not devoid of undesirable side-effects. Thus, some anti-adrenergics and more particularly the anti-adrenergic agents of the α-type are generally endowed with adrenolytic properties and, consequently, can very often give rise to bradycardia, hyperactivity of the gastro-intestinal tract and, more particularly, orthostatic hypotension. It is, in consequence, necessary, when using these substances, to determine the dosage required for each individual patient in order to avoid as far as possible orthostatic hypotension. This imposes a tedious and delicate task on the clinician.

Decahydroquinolinol derivatives which have pharmacological properties are already known. It is reported, for example in J. Med. Chem. 9, 455-457 (1966), that the isomers of 1-methyl-4-phenyl-transdecahydro-4-propionoxyquinoline possess analgesic properties.

However, no anti-adrenergic and anti-arrhythmic compounds belonging to the decahydroquinolinol series have been reported up to present. It was, therefore, not possible, from present knowledge, to deduce that the compounds of the invention could exert anti-adrenergic and anti-arrhythmic effects.

A new class of anti-arrhythmic and anti-adrenergic compounds has now been created and more particularly α-anti-adrenergic agents which are devoid of any adrenolytic action. The compounds of the invention have not, in fact, been found to reverse, even in high doses, the hypertensive effects of epinephrine. Consequently, the disadvantages listed hereabove, which originate from the adrenolytic action, may be completely avoided or at least considerably reduced by using compounds of the invention.

It is known from KERWIN and al. [see BURGER-Medicinal Chemistry-2nd edition page 576 (1960)], that the known anti-adrenergics "are too weak or transient in their action to be effective, the more potent and longer acting ones have side-effects which limit their usefulness". This author is here criticizing more particularly the α-anti-adrenergic agents which are adrenolytic. It may thus be reasonably concluded that the search of an ideal anti-adrenergic agent, namely one that is without any adrenolytic action, is a matter of primary importance.

Considered from this point of view, the compounds of the invention represent a valuable contribution to the advancement of anti-adrenergic therapy.

With a view to demonstrating the antagonistic action of compounds of the invention with respect to the toxicity of epinephrine and norepinephrine, various trials have been carried out for the purpose of determining the doses of the compounds in question to be administered to mice in order to ensure the survival of 50 percent of the animals after administration of the known $LD_{100}$ of these catecholamines.

The following method was used with epinephrine as the catecholamine employed.

The mice were divided into 6 groups of 20 animals. The following doses of the compound to be tested were administered by intragastric route:

| Group | Doses in mg/kg of the compound to be tested |
|-------|---------------------------------------------|
| 1 | 50 |
| 2 | 25 |
| 3 | 10 |
| 4 | 5 |
| 5 | 2.5 |
| 6 | 1 |

Thirty minutes later, 1 mg/kg of epinephrine (i.e. the $LD_{100}$) was injected intravenously to each group of animals. The dose of the compound to be tested which reduced by 50 percent the mortality which epinephrine could have caused under the experimental conditions employed was then determined. This protective dose is expressed as the $ED_{50}$ in mg/kg in the following Table.

All the compounds were employed in the form of a pharmaceutically acceptable acid addition salt, such as the hydrochloride, the acid oxalate, the acid fumarate or the methanesulphonate.

TABLE I

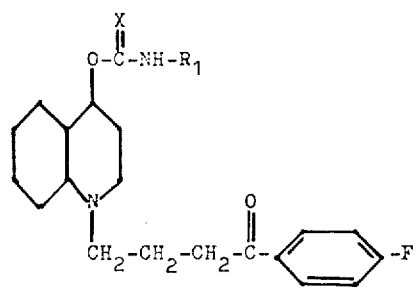

| X | $R_1$ | Protective dose against epinephrine toxicity = $ED_{50}$ (mg/kg) | Form |
|---|-------|----------------------------------------------|------|
| O | hydrogen | 2.50 | (1) |
| O | methyl | 5.00 | (1) |
| O | ethyl | 7.50 | (1) |
| O | isopropyl | 7.50 | (1) |
| O | allyl | 17.50 | (1) |
| O | phenyl | 3.75 | (1) |
| O | 4-methoxy-phenyl | 3.75 | (1) |
| O | 4-fluoro-phenyl | 2.50 | (1) |
| O | 4-chloro-phenyl | 5.00 | (1) |
| O | 4-bromo-phenyl | 2.50 | (1) |
| O | 3-chloro-phenyl | 17.50 | (1) |
| O | cyclopentyl | 5.00 | (1) |
| O | cyclohexyl | 17.50 | (1) |
| S | hydrogen | 7.00 | (1) |
| S | methyl | 25.00 | (1) |
| S | isopropyl | 12.50 | (1) |
| S | phenyl | 15.00 | (1) |
| S | 3-chloro-phenyl | 25.00 | (1) |
| O | hydrogen | 25.00 | (2) |
| O | allyl | 25.00 | (2) |

Under the same conditions, the $ED_{50}$ of thymoxamine was found to be 25 mg/kg.

These results prove that compounds of the invention have a powerful antagonistic effect with respect to the general toxicity of epinephrine, particularly in the case of the compounds 4-[4-bromophenyl)-carbamoyloxy]-1-[4-(4-fluoro-phenyl)-4-oxo-butyl]-transdecahydroquinoline [form (1)], 4-carbamoyloxy-1-[4-(4-fluoro-phenyl)-4-oxo-butyl]-trans-decahydroquinoline [form (1)] and 4-[(4-chlorophenyl)-carbamoyloxy]-1-[4-(4-fluoro-phenyl)-4-oxo-butyl]-transdecahydroquinoline [form (1)] (hereinafter referred to as Compound A, Compound B and Compound C respectively) which are 5 to 10 times more active than thymoxamine.

Tests have also been performed with a view to demonstrating the properties of the compounds of the invention with respect to epineprine-provoked hypertension in the dog anaesthetized with sodium pentobarbital and atropinized.

These tests showed that Compound B, for example, was capable of causing a marked decrease at a dose of 2 mg/kg by intravenous route. To produce the same decrease, in epinephrine-provoked hypertension, with thymoxamine an intravenous dose of 10 mg/kg was required.

Further tests have been carried out in order to determine the action of compounds of the invention against arrhythmia of various origins. For these tests, the arrhythmia-provoking agents used were strophantin, barium chloride and acetylcholine.

In these tests it was found that the ventricular tachycardia produced in the dog by strophantin according to the technique of Harris and Co-workers was rapidly corrected by Compound B and sinus rhythm restored. Normal cardiac rhythm lasted at least during the two-hour observation period that followed.

Positive results were also obtained in tests involving ventricular extrasystoles produced in the anaesthetized dog, according to the technique of Van Dongen, by means of an intravenous injection of 3 mg/kg of barium chloride. Normal rhythm was restored in a few seconds by an intravenous dose of 5 mg/kg of Compound B. It was found that the normal rhythm thus obtained was not in any way affected by a further intravenous dose of 3 mg/kg of barium chloride, administered 30 minutes later. This shows that the anti-arrhythmia action of Compound B in both curative and prophylatic.

In another test on anaesthetized dogs, auricular fibrillation provoked by acetylcholine in accordance with the technique of Scherf and Co-workers, was eliminated and sinus rhythm restored within 60 seconds by a 5 mg/kg intravenous dose of Compound B. Cardiac rhythm remained normal at least during the 3-hour observation period which followed.

Other pharmacological tests were performed on mice in order to determine the sedative action of the compounds of the invention on motricity.

The animals were first divided into two groups of which one group received the compound to be tested by intragastric route and the other group, the control group, received an equivalent quantity of the excipient used with the compound to be studied. Thirty minutes later, each group was placed in a cylindrical container, through which a ray of light was projected.

By means of a photoelectric cell, a record was made of the number of times the animals of each group passed through the light over a period of 15 minutes. The same trial was undertaken with other groups of mice but the dose of the compound to be tested varied from one group to another.

The active depressive dose 50 or $AD_{50}$, i.e. the dose of the compound under study which provokes a depressive action in 50 percent of the animals, can then be determined.

All the compounds were studied in the form of a pharmaceutically acceptable acid addition salt such as the hydrochloride, the acid oxalate, the acid fumarate or the methanesulphonate.

The results obtained are listed in the following Table.

TABLE II

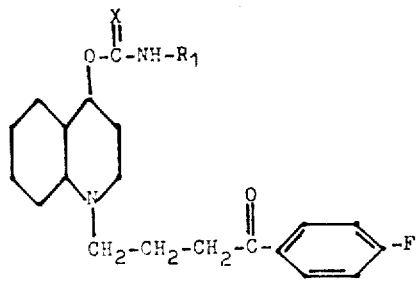

| X | $R_1$ | Depressive $AD_{50}$ in mg/kg | Form |
|---|---|---|---|
| O | hydrogen | 20 | (1) |
| O | methyl | 10 | (1) |
| O | ethyl | 50 | (1) |
| O | isopropyl | 50 | (1) |
| O | allyl | 15 | (1) |
| O | phenyl | 35 | (1) |
| O | 4-methoxy-phenyl | 35 | (1) |
| O | 4-fluoro-phenyl | 35 | (1) |
| O | 4-chloro-phenyl | 100 | (1) |
| O | 4-bromo-phenyl | 75 | (1) |
| O | 3-chloro-phenyl | 50 | (1) |
| O | benzyl | >50 | (1) |
| S | methyl | 10 | (1) |
| S | n-propyl | 35 | (1) |
| S | isopropyl | 20 | (1) |
| S | allyl | 10 | (1) |
| S | phenyl | >50 | (1) |
| S | 3-chloro-phenyl | >50 | (1) |
| O | hydrogen | 20 | (2) |
| O | allyl | 15 | (2) |

Tables I and II hereabove which provide respectively the doses corresponding to the $ED_{50}$ against the general toxicity of epinephrine and the motor depressive action $AD_{50}$ in mice, enable the following selection to be made according to the effect desired:

either the compounds in which the ratio between the motor sedative action and the anti-adrenergic action is favourable to the anti-adrenergic action, such as Compounds A and C, or the compounds in which the sedative action is maximum such as Compound B.

The considerable sedative action which characterizes certain compounds of the invention, such as for example Compound B, is likely to render them particularly valuable in the field of neuropsychiatry and more particularly for the treatment of various mental disturbances.

A certain number of toxicity tests have also been carried out and in particular acute toxicity tests in mice and rats by intragastric and intraperitoneal routes.

In the acute toxicity tests on mice, the animals were divided into five groups each of 10 animals. Each group received, by intragastric administration, a different dose of the compound under study suspended in 5 percent gum arabic. The various doses thus given were as follows:

| Group | Number of mg of Compound B |
|---|---|
| 1 | 300 |
| 2 | 500 |
| 3 | 750 |
| 4 | 1000 |
| 5 | 1500 |

The results obtained with Compound B are given in the following Table:

| Dose in mg/kg | 24 hours | Number of deaths after: 48 hours | 7 days |
|---|---|---|---|
| 300 | 0 | 0 | 0 |

-Continued

| Dose in mg/kg | Number of deaths after: | | |
|---|---|---|---|
| | 24 hours | 48 hours | 7 days |
| 500 | 0 | 0 | 0 |
| 750 | 2 | 2 | 2 |
| 1000 | 4 | 4 | 4 |
| 1500 | 5 | 5 | 5 |

From these results it may be calculated that the $LD_{50}$ of Compound B administered by intragastric route to mice is 1100 mg/kg.

By intraperitoneal route 5 groups each of 10 mice were used. Each group of animals received a different dose of Compound B in an aqueous solution. The various doses thus administered were as follows:

| Group | Number of mg of Compound B |
|---|---|
| 1 | 125 |
| 2 | 150 |
| 3 | 175 |
| 4 | 200 |
| 5 | 250 |

The results obtained with Compound B are given in the following Table:

| Dose in mg/kg | Number of deaths after : | | |
|---|---|---|---|
| | 24 hours | 48 hours | 7 days |
| 125 | 0 | 0 | 1 |
| 150 | 2 | 2 | 2 |
| 175 | 3 | 3 | 3 |
| 200 | 7 | 8 | 8 |
| 250 | 10 | | 10 |

From these results it may be calculated that the $LD_{50}$ of Compound B administered by intraperitoneal route to mice is 180 mg/kg.

In rats the $LD_{50}$ of Compounds A and B were found to be at least 2500 mg/kg and 1500 mg/kg by intragastric route and about 300 mg/kg and 155 mg/kg by intraperitoneal route respectively.

As compared with these $LD_{50}$ values, it was found that thymoxamine was considerably more toxic, the $LD_{50}$ for this latter substance, when administered to mice by intraperitoneal route, being, for example, 75 mg/kg.

It will be appreciated that for therapeutic use the compounds of the invention will normally be administered in the form of a pharmaceutical composition comprising as an essential active ingredient at least one compound of formula I or preferably a pharmaceutically acceptable acid addition salt thereof, in association with a pharmaceutical carrier therefor. The carrier may be a solid or liquid diluent or excipient of the kind normally employed in the production of medicaments ready for use, such diluent or excipient being, for example, one or more of the following substances: distilled water, benzyl alcohol, milk sugar, corn starch, talc, magnesium stearate, polyvinylpyrrolidone, monopotassium phosphate, dihydrated disodium phosphate, alginic acid, colloidal silica, polyethyleneglycol.

The composition may be made up in a form suitable for the desired mode of administration which may be by the oral, parenteral or rectal route.

Advantageously for clinical use, the composition is made up in a dosage unit form adapted for the desired mode of administration. The dosage unit may be, for example, a tablet, pill, packaged powder, capsule, syrup, a sterile solution packaged in a sealed container such as an ampoule for injection, or a suppository. The amount of active ingredient in each dosage unit will be such that one or more units are required for each therapeutic administration.

The following Examples illustrate the invention

EXAMPLE 1

4-Carbamoyloxy-1-[4-(4-fluoro-phenyl)-4-oxo-butyl]-trans-decahydroquinoline hydrochloride [form (1)]

a. 4-Hydroxy-trans-decahydroquinoline

A suspension of 532 g of aluminum isopropylate in one litre of dry isopropanol was refluxed and a solution of 326 g (2.13 mol) of 4-oxo-trans-decahydroquinoline in 425 ml of dry isopropanol was added drop-by-drop. The ketone which formed was eliminated continuously for 2 hours by means of a Dean-Stark system. A constant volume was maintained by adding isopropanol. After the ketone was eliminated reflux was maintained for 7 hours, the solvent was eliminated under vacuum and the complex so formed was decomposed by adding 950 ml of water and 2 litres of benzene. The aluminum hydroxide which formed was filtered out and the filter washed with about 2 litres of benzene. After the benzene phase was dried the solvent was eliminated under vacuum. By this procedure, 200 g of crude 4-hydroxy-trans-decahydroquinoline (M.P. 120°–145°C) were obtained, which represents a yield of 62.2 percent.

b. 1-[4-(4-Fluoro-phenyl)-4-oxo-butyl]-4-hydroxy-trans-decahydroquinoline

Separation of "form (2)"

A solution of 200 g of crude 4-hydroxy-trans-decahydroquinoline and 350 g of 4-chloro-1,1-ethylenedioxy-1-(4-fluoro-phenyl)-butane in 2 litres of n-butanol was refluxed for 72 hours in the presence of 200.2 g of dry potassium carbonate. The mixture was allowed to cool, the inorganic precipitate filtered off, the solvent evaporated under vacuum and the residue taken up in 1.5 litres of benzene. While stirring, the benzene solution was then poured into a hydrochloric acid solution (400 ml of concentrated hydrochloric acid and 1000 ml of water). To complete the hydrolysis of the ketal function, stirring was maintained for 2 hours. The mixture was then decanted, the aqueous phase made alkaline by means of a sodium hydroxide solution and extracted with 2 litres of benzene at 18°–20°C for 15 minutes. In both phases, a precipitate was observed and filtered out. In this way, 47 g of the insoluble form of 1-[4-(4-fluorophenyl)-4-oxo-butyl]-4-hydroxy-trans-decahydroquinoline [ form (2)], M.P. 85°–95°C (uncorrected) were obtained, which represents a yield of 11 percent.

Separation of "form (1)"

The organic phase of the filtrate previously obtained was then decanted, washed with water to neutrality and dried. The solvent was evaporated and a crude residue crystallized. By this procedure, 238 g of the soluble form of 1-[4-(4-fluoro-phenyl)-4-oxo-butyl]-4-hydroxy-trans-decahydroquinoline [form (1)], M.P. 95°–100°C, were separated out, which represents a yield of 58 percent.

After washing the crude product with hexane, 174.5 g of the pure compound were obtained, M.P. 108°–109°C, which represents a yield of 42 percent.

c. 4-Carbamoyloxy-1-[4-(4-fluoro-phenyl)-4-oxo-butyl]-trans-decahydroquinoline hydrochloride [form (1)]

520 ml of a 20 percent solution of phosgene in toluene was cooled to between −5°C and 0°C. To this solution of phosgene (0.545 mol) was added, at the same temperature, a solution of 174 g of 1-[4-(4-fluorophenyl)-4-oxo-butyl]-4-hydroxy-trans-decahydroquinoline [form (1)] in 2 litres of a 1:1 toluene/benzene mixture. Stirring was then maintained for 3 hours at 0°C and then for 40 hours at room-temperature.

To eliminate the excess of phosgene, the reaction mixture was first placed under vacuum for 2 hours and then heated to about 40°–45°C. After distilling off about 750 ml of solvents, the solution, which contained the corresponding 4-chloro-carbonyloxy derivative [form (1)] so formed, was cooled to 0°C, saturated with ammonia and stirred for 48 hours after which 500 ml of water and 500 ml of a concentrated ammonia solution were added. Stirring was continued for 24 hours, the solution filtered and the filter washed with water.

By this means, 187.5 g of crude 4-carbamoyloxy-1-[4-(4-fluoro-phenyl)-4-oxo-butyl]-trans-decahydroquinoline [form (1)] were obtained which gave, after recrystallization from ethyl acetate, 144.5 g of a product melting at 110°C.

The hydrochloride of this compound was prepared by treating 218.5 g of the base dissolved in a mixture of methanol and ethyl acetate with gaseous hydrochloric acid until a strongly acid pH was obtained. The reaction mixture was concentrated until crystallization commenced and then allowed to cool, after which the crystals which formed were separated out by filtration.

In this way 147.5 g of 4-carbamoyloxy-1-[4-fluoro-phenyl)-4-oxo-butyl]-trans-decahydroquinoline hydrochloride [form (1)], M.P. 252°–254°C, were obtained, which represents a yield of 67.5 percent.

EXAMPLE 2

4-Allylcarbamoyloxy-1-[4-(4-fluoro-phenyl)-4-oxo-butyl]trans-decahydroquinoline hydrochloride [form (1)]

From 3.19 g (0.01 mol) of 1-[4-(4-fluoro-phenyl)-4-oxo-butyl]-4-hydroxy-trans-decahydroquinoline [form (1)], the corresponding 4-chloro-carbonyloxy derivatives [form (1)] was prepared by the same procedure as that described in Example 1. To the benzene solution containing the 4-chloro-carbonyloxy derivatives [form (1)] were added 10 ml of allylamine dissolved in 25 ml of benzene and the resulting solution was allowed to react for 48 hours at room temperature.

100 ml of water were added and after one hour, the solution was made alkaline by adding potassium carbonate. The aqueous phase was decanted and after further extraction with benzene, the benzene phases were washed with water. After drying, the benzene was eliminated and the crude product was recrystallized from benzene. By this means, 1.30 g of 4-allylcarbamoyloxy-1-[4-(4-fluoro-phenyl)-4-oxo-butyl]-trans-decahydroquinoline [form (1)] were obtained, M.P. 92°C.

The hydrochloride of this compound was prepared by treating a solution of base in either with gaseous hydrochloride acid, the hydrochloride had a M.P. of 148°–160°C (when recrystallized from ethyl acetate).

By the same procedure, the following compounds were prepared from the corresponding 4-chloro-carbonyloxy derivative [form (1)] and the appropriate amine:

| Compound | Melting point in °C |
|---|---|
| 1-[4-(4-fluoro-phenyl)-4-oxo-butyl]-4-methyl-carbamoyloxy-trans-decahydroquinoline hydrochloride [form (1)] | 119–122 |
| 4-ethylcarbamoyloxy-1-[4-(4-fluoro-phenyl)-4-oxo-butyl]-trans-decahydroquinoline acid oxalate [form (1)] | 146–150 |
| 1-[4-(4-fluoro-phenyl)-4-oxo-butyl]-4-n-propyl-carbamoyloxy-trans-decahydroquinoline acid oxalate [form (1)] | 123–130 |
| 1-[4-(4-fluoro-phenyl)-4-oxo-butyl]-4-isopropyl-carbamoyloxy-trans-decahydroquinoline acid fumarate [form (1)] | ±90 |
| 1-[4-(4-fluoro-phenyl)-4-oxo-butyl]-4-phenyl-carbamoyloxy-trans-decahydroquinoline hydrochloride [form (1)] | 144–146 |
| 1-[4-(4-fluoro-phenyl)-4-oxo-butyl]-4-[(4-methoxy-phenyl)-carbamoyloxy]-trans-decahydroquinoline hydrochloride [form (1)] | 149–151 |
| 4-[(4-fluoro-phenyl)-carbamoyloxy]-1-[4-(4-fluoro-phenyl)-4-oxo-butyl]-trans-decahydroquinoline hydrochloride [form (1)] | 120–123 |
| 4-[(4-chloro-phenyl)-carbamoyloxy]-1-[4-(4-fluoro-phenyl)-4-oxo-butyl]-trans-decahydroquinoline hydrochloride [form (1)] | 191–193 |
| 4-[(4-bromo-phenyl)-carbamoyloxy]-1-[4-(4-fluoro-phenyl)-4-oxo-butyl]-trans-decahydroquinoline hydrochloride [form (1)] | 165–175 |
| 4-[(3-chloro-phenyl)-carbamoyloxy]-1-[4-(4-fluoro-phenyl)-4-oxo-butyl]-trans-decahydroquinoline methanesulphonate [form (1)] | 179–181 |
| 4-benzylcarbamoyloxy-1-[4-(4-fluoro-phenyl)-4-oxo-butyl]-trans-decahydroquinoline hydrochloride [form (1)] | 112–115 |
| 4-cyclopentylcarbamoyloxy-1-[4-(4-fluoro-phenyl)-4-oxo-butyl]-trans-decahydroquinoline methanesulphonate [form (1)] | 209–210 |
| 4-cyclohexylcarbamoyloxy-1-[4-(4-fluoro-phenyl)-4-oxo-butyl]-trans-decahydroquinoline hydrochloride [form (1)] | 120–125 |

EXAMPLE 3

4-Carbamoyloxy-1-[4-(4-fluoro-phenyl)-4-oxo-butyl]-trans-decahydroquinoline [form (1)]

While stirring, 11.73 g (0.075 mol) of phenyl chloroformate were added drop-by-drop to a solution of 15.97 g (0.05 mol) of 1-[4-(4-fluoro-phenyl)-4-oxo-butyl]-4-hydroxy-trans-decahydroquinoline [form (1)] in 10 ml of pyridine and 160 ml of benzene, care being taken to maintain the temperature between 0°C and 30°C. Stirring was continued for 48 hours at room-temperature and the solution was then poured into an aqueous solution of sodium carbonate. The aqueous phase was decanted and extracted with benzene. The organic phase was washed with water, dried and discoloured with active charcoal, after which the solvent was eliminated. Then, 100 ml of methanol saturated with ammonia were added to the residue. After 34 hours at room-temperature the solution was filtered and the filter was washed with ether.

In this manner 11.1 g of crude 4-carbamoyloxy-1-[4-(4-fluorophenyl)-4-oxo-butyl]-trans-decahydroquinoline [form (1)] were obtained, M.P. 94°–95°C.

EXAMPLE 4

4-Carbamoyloxy-1-[4-(4-fluoro-phenyl)-4-oxo-butyl]-trans-decahydroquinoline hydrochloride [form (2)]

From 3.19 g (0.01 mol) of 1-[4-(4-fluoro-phenyl)-4-oxo-butyl]-4-hydroxy-trans-decahydroquinoline [form (2)] obtained as described in Example 1, the corresponding 4-chloro-carbonyloxy derivative [form (2)] was prepared in tetrahydrofuran in a similar manner to that employed in Example 1.

The 4-chloro-carbonyloxy derivative [form (2)] was then reacted with ammonia and the resulting compound was separated out in the manner described in Example 1 and recrystallized with acetone.

By this procedure, 1.5 g of 4-carbamoyloxy-1-[4-(4-fluoro-phenyl)-4-oxo-butyl]-trans-decahydroquinoline [form (2)] were obtained, M.P. 153°–155°C.

The corresponding hydrochloride was prepared from an ethereal solution of the free base and hydrochloric acid in a known manner and was recrystallized from an ethyl acetate/acetone/methanol mixture to give a M.P. of 243°–244°C.

In the same manner by reacting the corresponding 4-chlorocarbonyloxy derivative [form (2)] with the appropriate amine, the following compounds were prepared:

| Compound | Melting point in °C |
|---|---|
| 4-allylcarbamoyloxy-1-[4-(4-fluoro-phenyl)-4-oxo-butyl]-trans-decahydroquinoline hydrochloride [form (2)] | 224–226 |
| 1-[4-(4-fluoro-phenyl)-4-oxo-butyl]-4-phenyl-carbamoyloxy-trans-decahydroquinoline hydrochloride [form (2)] | 232–234 |
| 4-[(4-chloro-phenyl)-carbamoyloxy]-1-[4-(4-fluoro-phenyl)-4-oxo-butyl]-trans-decahydroquinoline hydrochloride [form (2)] | 215–218 |
| 1-[4-(4-fluoro-phenyl)-4-oxo-butyl]-4-[4-methoxy-phenyl)-carbamoyloxy]-trans-decahydroquinoline hydrochloride [form (2)] | 203–205 |
| 4-[(3-chloro-phenyl)-carbamoyloxy]-1-[4-(4-fluoro-phenyl)-4-oxo-butyl]-trans-decahydroquinoline hydrochloride [form (2)] | 231–233 |

EXAMPLE 5

1-[4-(4-Fluoro-phenyl)-4-oxo-butyl]-4-thiocarbamoyloxy-transdecahydroquinoline hydrochloride [form (1)]

3.19 g (0.01 mol) of 1-]4-(4-fluoro-phenyl)-4-oxo-butyl]-4-hydroxy-trans-decahydroquinoline [form (1)] dissolved in 40 ml of benzene were reacted for 60 hours at room-temperature with 2.3 g (0.02 mol) of thiophosgene dissolved in 10 ml of benzene to form the corresponding 4-chloro-thiocarbonyloxy derivative [form (1)].

By partial distillation of the benzene, the excess of thiophosgene was eliminated and by a process similar to that described in Example 1, the 4-chloro-triocarbonyloxy derivative [form (1)] was treated with ammonia to form 1.27 g of 1-[4-(4-fluoro-phenyl)-4-oxo-butyl]-4-thiocarbamoyloxy-trans-decahydroquinoline [form (1)]. The hydrochloride, prepared from the base in a known manner, had a M.P. of 223°–225°C when recrystallized from an ethyl acetate/acetone/methanol mixture.

By the same procedure but using the 4-chloro-thiocarbonyloxy [form (1)] derivative with an appropriate amine instead of ammonia, the following compounds were prepared:

| Compound | Melting point in °C |
|---|---|
| 1-[4-(4-fluoro-phenyl)-4-oxo-butyl]-4-methyl-thiocarbamoyloxy-trans-decahydroquinoline hydrochloride [form (1)] | 191–193 |
| 1-[4-(4-fluoro-phenyl)-4-oxo-butyl]-4-n-propyl-thiocarbamoyloxy-trans-decahydroquinoline hydrochloride [form (1)] | 200–202 |
| 1-[4-(4-fluoro-phenyl)-4-oxo-butyl]-4-isopropyl-thiocarbamoyloxy-trans-decahydroquinoline hydrochloride [form (1)] | 183–185 |
| 4-allylthiocarbamoyloxy-1-[4-(4-fluoro-phenyl)-4-oxo-butyl]-trans-decahydroquinoline hydrochloride [form (1)] | 180–182 |
| 1-[4-(4-fluoro-phenyl)-4-oxo-butyl]-4-phenylthio-carbamoyloxy-trans-decahydroquinoline fumarate [form (1)] | 193–194 |
| 4-[(3-chloro-phenyl)-thiocarbamoyloxy]-1-[4-(4-fluoro-phenyl)-4-oxo-butyl]-trans-decahydroquinoline fumarate [form (1)] | 184–185 |

EXAMPLE 6

Tablets were prepared by granulating and compressing the following ingredients in accordance with known pharmaceutical techniques:

| Ingredient | mg per tablet |
|---|---|
| 4-Carbamoyloxy-1-[4-(4-fluoro-phenyl)-4-oxo-butyl]-trans-decahydroquinoline hydrochloride [form (1)] | 40.0 |
| Lactose | 90.0 |
| Corn starch | 54.0 |
| Polyvinylpyrrolidone | 6.0 |
| Alginic acid | 4.0 |
| Talc | 4.0 |
| Colloidal silica | 0.5 |
| Magnesium stearate | 1.5 |
|  | 200.0 |

EXAMPLE 7

Injectable solutions were prepared in accordance with known pharmaceutical techniques from the following ingredients:

| Injectable solution I | |
|---|---|
| Ingredient | mg |
| 4-Carbamoyloxy-1-[4-(4-fluoro-phenyl)-4-oxo-butyl]-trans-decahydroquinoline hydrochloride [form (1)] | 10 |
| Benzyl alcohol | 10 |
| Polyethyleneglycol 400 | 40 |
| Distilled water q.s. to give | 1 ml |
| Injectable solution II | |
| Ingredient | mg |
| 4-Carbamoyloxy-1-[4-(4-fluoro-phenyl)-4-oxo-butyl]-trans-decahydroquinoline hydrochloride [form (1)] | 10.0 |
| Benzyl alcohol | 20.0 |
| Monopotassium phosphate | 1.5 |
| Disodium phosphate .2$H_2O$ | 1.0 |
| Polyvinylpyrrolidone | 20.0 |
| Distilled water q.s. to give | 1.0 ml |

We claim:

1. A heterocyclic compound of the formula

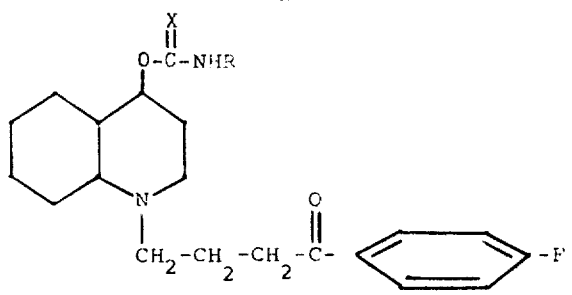

and pharmaceutically acceptable acid addition salts thereof, wherein R represents hydrogen, lower alkyl having 1 to 3 carbon atoms, allyl, cycloalkyl having 5 to 6 carbon atoms, phenyl, phenyl substituted by a fluorine, chlorine or bromine atom or methoxyl group, or benzyl, and X represents an oxygen or sulphur atom.

2. A compound as defined by claim 1 wherein X is oxygen.

3. A compound as defined by claim 1 wherein X is sulphur.

4. A compound as defined by claim 2 wherein R is hydrogen.

5. A compound as defined by claim 2 wherein R is lower alkyl.

6. The compound as defined by claim 2 wherein R is phenyl.

7. The compound as defined by claim 2 wherein R is 4-bromophenyl.

8. The compound as defined by claim 2 wherein R is 4-chlorophenyl.

9. The compound as defined by claim 3 wherein R is methyl.

10. The compound as defined by claim 3 wherein R is 3-chlorophenyl.

* * * * *